US012619514B2

(12) United States Patent
Gassmann et al.

(10) Patent No.: US 12,619,514 B2
(45) Date of Patent: May 5, 2026

(54) SYSTEM AND METHOD FOR EXECUTING FUNCTIONALLY EQUIVALENT APPLICATIONS

(71) Applicant: Robert Bosch GmbH, Stuttgart (DE)

(72) Inventors: Bernd Gassmann, Aspach (DE); Charles Kalleppally, Aalen (DE); Uwe Wilbrand, Leutenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 659 days.

(21) Appl. No.: 17/887,087

(22) Filed: Aug. 12, 2022

(65) Prior Publication Data

US 2023/0066444 A1 Mar. 2, 2023

(30) Foreign Application Priority Data

Sep. 1, 2021 (DE) ..................... 10 2021 209 627.1

(51) Int. Cl.
| | |
|---|---|
| *G06F 11/34* | (2006.01) |
| *B60W 50/04* | (2006.01) |
| *B60W 60/00* | (2020.01) |
| *H04L 67/12* | (2022.01) |

(52) U.S. Cl.
CPC ......... *G06F 11/3409* (2013.01); *B60W 50/04* (2013.01); *B60W 60/00* (2020.02); *H04L 67/12* (2013.01); *B60W 2554/00* (2020.02)

(58) Field of Classification Search
None
See application file for complete search history.

(56) References Cited

U.S. PATENT DOCUMENTS

| | | | |
|---|---|---|---|
| 10,698,625 B2 | 6/2020 | Das et al. | |
| 2020/0183811 A1* | 6/2020 | Krishnan | ............ G06F 11/3688 |
| 2021/0274145 A1 | 9/2021 | Kvaalen | |
| 2021/0295223 A1* | 9/2021 | Freeman | ............ G06F 11/3428 |

FOREIGN PATENT DOCUMENTS

| | | |
|---|---|---|
| DE | 102013205392 A1 | 10/2014 |
| DE | 102014019531 A1 | 6/2016 |
| DE | 102015217386 A1 | 3/2017 |
| WO | 20200121292 A1 | 6/2020 |

* cited by examiner

*Primary Examiner* — Craig C Dorais
(74) *Attorney, Agent, or Firm* — NORTON ROSE FULBRIGHT US LLP

(57) ABSTRACT

A system for executing functionally equivalent applications. The system includes a cloud system including a plurality of cloud instances, the plurality of cloud instances being set up in each case to execute a functionally equivalent application in each case based on the same input data, the respective execution including a processing of the input data by the respective application in order to output an application result in each case, and a comparison device, which is set up to compare the respective application results in order to ascertain a comparison result and to output the comparison result that has been ascertained. A method for executing functionally equivalent applications, a computer program, and a machine-readable storage medium, are also described.

17 Claims, 3 Drawing Sheets

101

109

111

105

103 first application

113

107 second application third application comparison device — 115

203 execute functionally equivalent applications process input data

201 output each application result — 205 compare application results — 207 output comparison result — 209

SYSTEM AND METHOD FOR EXECUTING FUNCTIONALLY EQUIVALENT APPLICATIONS

CROSS REFERENCE

The present application claims the benefit under 35 U.S.C. § 119 of German Patent Application No. DE 10 2021 209 627.1 filed on Sep. 1, 2021, which is expressly incorporated herein by reference in its entirety.

FIELD

The present invention relates to a system for executing functionally equivalent applications, a method for executing functionally equivalent applications, a computer program, and a machine-readable storage medium.

BACKGROUND INFORMATION

The published U.S. Patent Application No. 2021/00274145 A1 describes a system and a method for distributed computing using graphics processors.

The published International Patent Application No. WO 2020/121292 A1 describes data processing in a serverless environment.

The U.S. Pat. No. 10,698,625 B2 describes data pipeline architecture.

SUMMARY

An object of the present invention is to provide a way for executing functionally equivalent applications.

This object may be achieve according to the present invention. Advantageous example embodiments of the present invention are disclosed herein.

According to a first aspect of the present invention, a system for executing functionally equivalent applications is provided.

According to an example embodiment of the present invention, the system includes:
a cloud system including a plurality of cloud instances, the plurality of cloud instances being set up in each case to execute a functionally equivalent application in each case based on the same input data, the respective execution including a processing of the input data by the respective application in order to output an application result in each case, and
a comparison device, which is set up to compare the respective application results in order to ascertain a comparison result and to output the comparison result that has been ascertained.

According to a second aspect of the present invention, a method for executing functionally equivalent applications using a cloud system including a plurality of cloud instances is provided.

According to an example embodiment of the present invention, the method includes the following steps:
executing a functionally equivalent application in each case based on the same input data on the cloud instances, the respective execution including a processing of the input data by the respective application in order to output an application result in each case,
comparing the respective application results to ascertain a comparison result, and
outputting the ascertained comparison result.

According to a third aspect of the present invention, a computer program is provided, including commands which, when the computer program is executed by a computer, for example by the system according to the first aspect, cause said computer to execute a method according to the second aspect.

According to a fourth aspect of the present invention, a machine-readable storage medium is provided, on which the computer program according to the third aspect is stored.

The present invention is based on, and incorporates, the finding that the above object may be achieved by using a plurality of cloud instances to execute functionally equivalent applications based on the same input data. This brings about the technical advantage that, for example, high availability of the function corresponding to the functionally equivalent applications can be achieved. Even if one cloud instance should fail, one or more further cloud instances are still available to be able to execute the applications, in order ultimately to be able to provide the function in this way.

This is advantageous in particular for applications in which safety and high availability are important. One example, which will be explained later in the following, is the at least partially automated guiding of a motor vehicle. Here, input data, for example environment data, which describe an environment of the motor vehicle, are processed, for example, in order to detect objects in the environment of the motor vehicle. Based on the detected objects, for example, control signals for the at least partially automated control of a lateral and/or longitudinal guidance of the motor vehicle are generated and output. There is a requirement for high availability in the case of this processing.

Because a plurality of functionally equivalent applications are executed, which process the same input data, a plurality of application results, i.e., the results of the steps of processing the same input data by the applications, are accordingly available. Based on these results, for example, decisions are made and/or measures are implemented and/or machines are controlled. In safety-critical environments in particular, there is a need for the results to be reliable, for them to be trustworthy, in other words for them to be correct.

Ideally, all applications should arrive at the same result, at least within customary tolerances. Should the results be at least partially different, this may be a sign that, for example, the results cannot be trusted, or can only be trusted to a limited extent. In such a case, for example, a safety measure is carried out: for example, a machine is put into a safe state.

In the above example of the at least partially automated guiding of a motor vehicle, it may be provided, for example, that the control signals are generated in such a way that, in the case of an at least partially automated control of the lateral and/or longitudinal guidance of the motor vehicle, based on the control signals, the motor vehicle decelerates and, for example, stops or, for example, drives on at a lower speed than before the deceleration, and/or increases a distance to a preceding road user, e.g. a motor vehicle or a cyclist.

Because a plurality of application results are available, it is possible in the context of the comparison, for example, to ascertain which results form the majority, so that the result corresponding to the majority is considered valid, i.e., correct. As a result, for example, the high requirements to which safety-critical applications are subject can be met. These requirements are defined in ISO 26262, for example.

In summary, a method and device for executing functionally equivalent applications is provided, which brings about high availability and meets high safety requirements.

According to one specific embodiment of the system of the present invention, in each of the cloud instances, a Kubernetes-based monitoring is implemented, which is set up to monitor the execution of the application.

This may bring about the technical advantage that, for example, the execution of the application can be monitored efficiently. A Kubernetes-based monitoring includes, for example, a Kubernetes platform and/or a Kubernetes infrastructure. The Kubernetes-based monitoring may be implemented, for example, in hardware and/or in software.

In one specific embodiment of the system of the present invention, the comparison device is set up to compare the respective application results on a lockstep basis.

This may bring about the technical advantage that, for example, the application results can be compared efficiently.

According to this specific example embodiment of the present invention, it is therefore provided that the lockstep, as has been applied up to the present in microcontrollers and processors, is transferred to the cloud. On a lockstep basis means, therefore, that the processing of the input data by two or more executing units (applications), each on a cloud infrastructure, is executed in a distributed manner, i.e., multiple times. The applications calculate an application result independently of each other. These application results are brought together and compared with each other. If the comparison is successful, the application result is utilized for further processing; otherwise, it is rejected or labeled as unreliable (confidence).

The comparison may be, for example, an exact one, and may include in each case a comparison of the complete application results. For reasons of efficiency, the comparison may also, for example, compare only a checksum and/or hash and/or fingerprint of the application results in each case.

With two cloud instances, for example, an erroneous comparison leads to the rejection of the application result. With a plurality of cloud instances, the lockstep mechanism may, for example, transition to a majority evaluation with an error correction or evaluation of the individual application result with a degree of reliability.

Depending on the error scenarios, distribution may, for example, be limited to different hardware instances in the same computing center, or, for example, it may in addition or instead refer to different cloud instances with separate networks ("availability zones"), or geographically distributed cloud instances. This depends in particular on the safety requirements and error scenarios used.

The calculation may be performed, for example, by identical applications, but in addition or instead, for example, by applications which are only functionally equivalent, but otherwise use different algorithms, programming languages or programming techniques, likewise depending on the error scenarios under consideration.

In one specific example embodiment of the system of the present invention, the comparison device is set up to evaluate the respective application results, so that the comparison of the respective application results includes a comparison of the evaluated application results.

This may bring about the technical advantage that, for example, the application results can be compared efficiently.

The application results are, for example, used, e.g., where they are the same or e.g. after a majority vote, or, for example, rejected, e.g. where they are not the same, in the case of an error, and/or where they are in a minority.

The comparison is, for example, a check that the representation of the application results as a bit sequence is identical in all cases.

According to one specific example embodiment of the present invention, the comparison includes reducing the application results in each case to a checksum and/or a fingerprint and/or a compressed representation and comparing them.

In particular in the case of a large number of application results, and/or application results which describe a plurality of, in particular different, information items, e.g. object lists of objects in the environment of a motor vehicle, wherein the state of each object is described by a set of attributes, for example, such an approach is efficient and meaningful, inasmuch as, for example, fewer data have to be processed for the comparison, which can speed up the comparison.

In one specific example embodiment of the present invention, the evaluation includes a stipulation that, in the event of differences in rounding and/or order (in object lists), and/or similar discrepancies between two or more application results, these are nevertheless the same in each case.

If the processing of the input data is ascertained not by identical applications, but only by functionally equivalent ones, it may be necessary and meaningful for the comparison to take account of differences in rounding and/or order in object lists, and/or similar discrepancies, and nevertheless to evaluate the respective application results as being the same.

In one specific example embodiment of the system of the present invention, the respective application results are evaluated as a function of the particular cloud instance in which the corresponding application was executed.

This may bring about the technical advantage that, for example, the application results can be evaluated efficiently.

In one specific example embodiment of the system of the present invention, the cloud instances are each characterized by one or more of the following cloud instance attributes, the comparison device being set up to evaluate the respective application results as a function of one or more of the following cloud instance attributes: location, computing capacity, bandwidth.

This may bring about the technical advantage that, for example, the respective application results can be evaluated efficiently.

In one specific example embodiment of the system of the present invention, the function corresponding to the functionally equivalent applications includes an at least partially automated driving function, in particular an infrastructure-based, at least partially automated driving function.

This may bring about the technical advantage that, for example, a particularly important function is made available. In particular, this brings about the technical advantage that safety applications, as must be met in the context of the at least partially automated guiding of a motor vehicle, can be met efficiently.

In one specific example embodiment of the system of the present invention, the input data include environment data, which represent an environment of a motor vehicle, the processing of the input data by the respective application including analyzing the environment data to detect one or more objects in the motor vehicle's environment, each application result including an object list, which indicates the detected object or objects in the motor vehicle's environment.

This may bring about the technical advantage that, for example, the object list thus created can be used efficiently and safely in the context of an at least partially automated driving function.

In one specific example embodiment of the method of the present invention, in each of the cloud instances a Kubernetes-based monitoring is implemented, which monitors the execution of the application.

In one specific example embodiment of the method of the present invention, the respective application results are compared on a lockstep basis.

In one specific example embodiment of the method of the present invention, the respective application results are evaluated so that the comparison of the respective application results includes a comparison of the evaluated application results.

In one specific example embodiment of the method of the present invention, the respective application results are evaluated as a function of the particular cloud instance in which the corresponding application was executed.

In one specific example embodiment of the method of the present invention, the cloud instances are each characterized by one or more of the following cloud instance attributes, the respective application results being evaluated as a function of one or more of the following cloud instance attributes: location, computing capacity, bandwidth.

In one specific example embodiment of the method of the present invention, the function corresponding to the functionally equivalent applications includes an at least partially automated driving function, in particular an infrastructure-based, at least partially automated driving function.

In one specific example embodiment of the method of the present invention, the input data include environment data, which represent an environment of a motor vehicle, the processing of the input data by the respective application including analyzing the environment data to detect one or more objects in the motor vehicle's environment, each application result including an object list, which indicates the detected object or objects in the motor vehicle's environment.

It is noted at this point that the input data may be any data. The present invention described here may, in principle, be used for all types of cloud applications.

According to the preceding specific example embodiment of the present invention, the input data may be environment data, which describe an environment of a motor vehicle. Environment data include, for example, environment sensor data from one or more environment sensors, for example environment sensor raw data, e.g. in the form of jpeg and/or pixel clouds, and/or pre-processed environment sensor raw data, for example in the form of object lists of objects in the motor vehicle's environment. Environment data describe in particular a traffic situation of an observed locality, in particular as a whole or in portions (spatial, temporal, spectral (visible light, infrared, microwave, etc.)).

An environment sensor is, for example, one of the following environment sensors: radar sensor, video sensor, LiDAR sensor, magnetic field sensor, infrared sensor, microwave sensor, ultrasonic sensor. An environment sensor may be, for example, an environment sensor of the motor vehicle. An environment sensor may be, for example, an environment sensor of an infrastructure.

An application result according to one specific example embodiment of the present invention includes, in particular if the input data include the above-mentioned environment data, object lists, which describe the traffic situation of the locality under consideration, of both static and dynamic objects, and/or control information for individual motor vehicles, which assists the driving control thereof.

Application results are processed further, for example, within the cloud instance, and/or are, for example, transmitted externally, for example, to a motor vehicle.

Statements made in connection with the system apply mutatis mutandis to the method, and vice versa.

According to one specific example embodiment of the present invention, the method according to the second aspect is a computer-implemented method.

An at least partially automated driving function is able to guide the motor vehicle in an at least partially automated fashion.

The formulation "at least partially automated guiding" includes one or more of the following cases: assisted guiding, partially automated guiding, highly automated guiding, fully automated guiding. The formulation "at least partially automated" therefore includes one or more of the following formulations: assisted, partially automated, highly automated, fully automated.

Assisted guiding means that a driver of the motor vehicle constantly carries out either the lateral or the longitudinal guidance of the motor vehicle. The other driving task (i.e. control of the longitudinal or lateral guidance of the motor vehicle) is performed automatically. In other words, in the case of assisted guiding of the motor vehicle, either the lateral guidance or the longitudinal guidance is controlled automatically.

Partially automated guiding means that, in a specific situation (for example: driving on a freeway, driving within a parking lot, overtaking an object, driving within a traffic lane which is defined by lane markings), and/or for a certain period of time, a longitudinal guidance and a lateral guidance of the motor vehicle are controlled automatically. A driver of the motor vehicle does not have to control the longitudinal and lateral guidance of the motor vehicle himself manually. However, the driver must constantly monitor the automatic control of the longitudinal and lateral guidance in order to be able to intervene manually if necessary. The driver must be ready at all times to take over vehicle guidance completely.

Highly automated guiding means that, for a certain period of time in a specific situation (for example: driving on a freeway, driving within a parking lot, overtaking an object, driving within a traffic lane which is defined by lane markings), a longitudinal guidance and a lateral guidance of the motor vehicle are controlled automatically. A driver of the motor vehicle does not have to control the longitudinal and lateral guidance of the motor vehicle himself manually. The driver does not have to constantly monitor the automatic control of the longitudinal and lateral guidance in order to be able to intervene manually if necessary. If necessary, a takeover request is automatically issued to the driver to take over the control of the longitudinal and lateral guidance, in particular with an adequate time reserve. The driver must therefore be potentially capable of taking over control of the longitudinal and lateral guidance. Limits of the automatic control of the lateral and longitudinal guidance are recognized automatically. In the case of highly automated guiding, it is not possible to bring about a minimal-risk state automatically in every starting situation.

Fully automated guiding means that, in a specific situation (for example: driving on a freeway, driving within a parking lot, overtaking an object, driving within a traffic lane which is defined by lane markings), a longitudinal guidance and a lateral guidance of the motor vehicle are controlled automatically. A driver of the motor vehicle does not have to control the longitudinal and lateral guidance of the motor vehicle himself manually. The driver does not have to monitor the automatic control of the longitudinal and lateral guidance in order to be able to intervene manually if necessary. Before the automatic control of the lateral and longitudinal guidance is ended, a request is automatically made to the driver to take over the driving task (controlling the lateral and longitudinal guidance of the motor vehicle), in particular with an adequate time reserve. Should the driver fail to take over the driving task, reversion to a minimal-risk state occurs automatically. Limits of the automatic control of the lateral and longitudinal guidance are recognized automatically. In all situations, it is possible to revert automatically to a minimal-risk system state.

According to one specific example embodiment of the present invention, the method according to the second aspect is executed or carried out by way of the system according to the first aspect.

System features can be derived in particular from corresponding method features, and vice versa. This means in particular, therefore, that technical functionalities of the system according to the first aspect are derived analogously from corresponding technical functionalities of the method according to the second aspect, and vice versa.

The exemplary embodiments and specific embodiments of the present invention described here can be combined with each other in any combination, even if this is not described explicitly.

An at least partially automated driving function according to one specific example embodiment is an element selected from the following group of at least partially automated driving functions: traffic jam assistance function, parking assistance function, lane-keeping assistance function, overtaking assistance function, longitudinal guidance function, lateral guidance function, longitudinal and lateral guidance function.

This may bring about the technical advantage that, for example, particularly suitable at least partially automated driving functions can be selected.

An environment sensor within the meaning of the description, according to one specific embodiment, is one of the following environment sensors: radar sensor, LiDAR sensor, ultrasonic sensor, video sensor, magnetic field sensor, capacitive sensor, temperature sensor, moisture sensor, humidity sensor, audio sensor, and infrared sensor.

In one specific example embodiment of the present invention, the plurality of cloud instances are spatially distributed, for example across a plurality of countries, for example across a plurality of continents.

A cloud instance is defined as follows, for example, and therefore includes, for example, the following features: a communication interface for communicating, i.e. in particular for receiving the input data and for transmitting the application result over a communication network, and a computing unit for executing the application.

A cloud instance is, for example, a Kubernetes platform in the Azure cloud, and provides services, for example, based on Docker containers.

The cloud instance is set up, for example, such that the application may be implemented scalably, and the configuration and operation thereof may be automated. This includes, for example, the implementation of instances, the distribution thereof across various (spatially separate, independent) availability zones, the monitoring thereof, and, if appropriate, re-instantiation.

Exemplary embodiments of the present invention are shown in the figures and will be explained in more detail in the following description.

DETAILED DESCRIPTION OF EXAMPLE EMBODIMENTS

Figure 1:
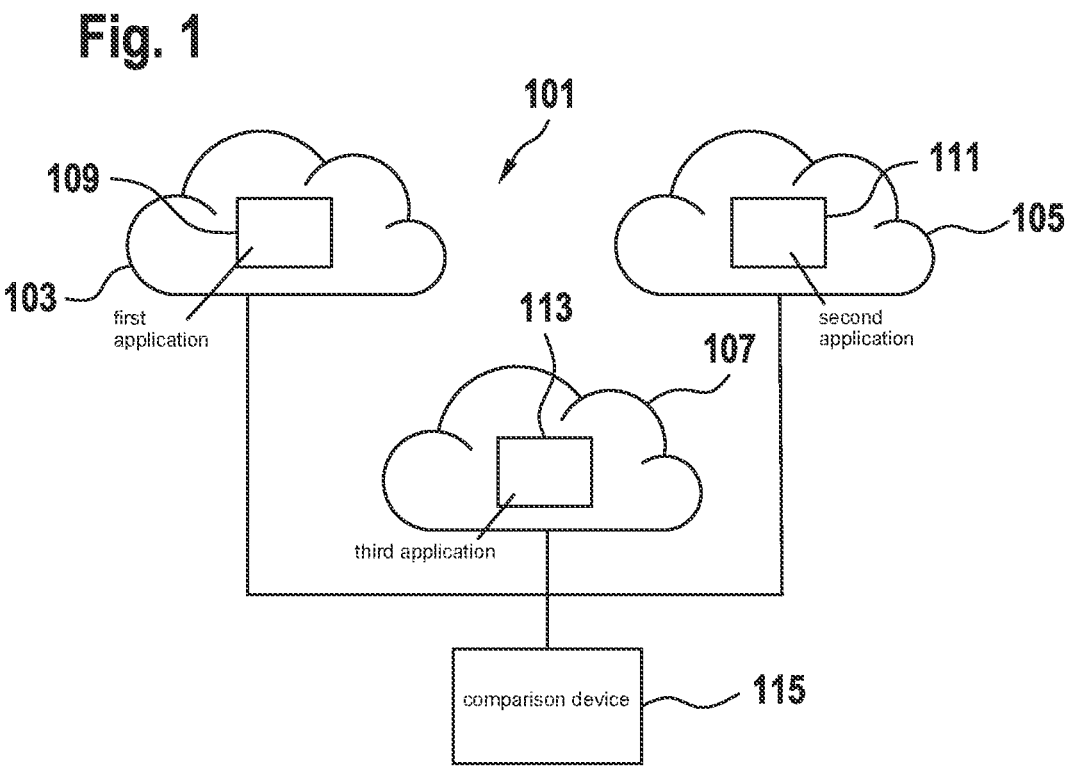
FIG. 1 shows a first system for executing functionally equivalent applications, according to an example embodiment of the present invention.

FIG. 1 shows a first system 101 for executing functionally equivalent applications.

System 101 includes a first cloud instance 103, a second cloud instance 105, and a third cloud instance 107. The first cloud instance 103 is set up to execute a first application 109. The second cloud instance 105 is set up to execute a second application 111. The third cloud instance 107 is set up to execute a third application 113. The three applications 109, 111, 113 are functionally equivalent applications. This means that the three applications 109, 111, 113 execute the same function. For example, the three applications 109, 111, 113 may be identical or, for example, they may differ with regard to their programming language.

Cloud instances 103, 105, 107 execute these functionally equivalent applications 109, 111, 113 based on the same input data in each case, the respective execution including a processing of the input data by the respective application 109, 111, 113 in order to output an application result in each case.

First system 101 further includes a comparison device 115, which is set up to compare the respective application results in order to ascertain a comparison result and to output the comparison result that has been ascertained.

Figure 2:
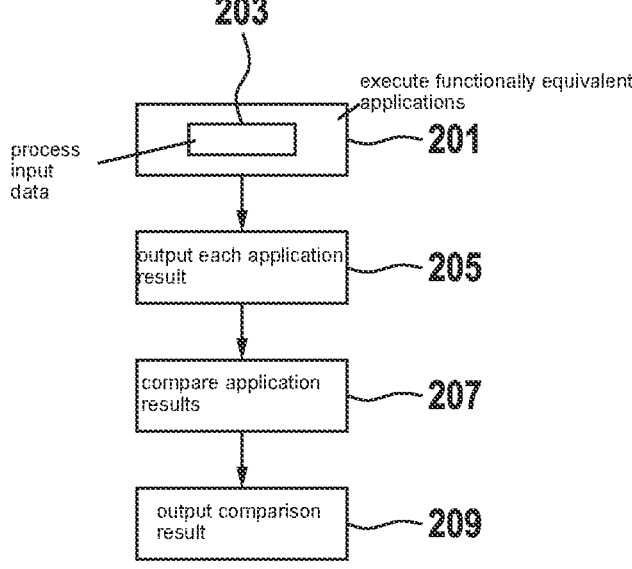
FIG. 2 is a flow chart of a method for executing functionally equivalent applications, according to an example embodiment of the present invention.

FIG. 2 is a flow chart of a method for executing functionally equivalent applications using a cloud system including a plurality of cloud instances, including the following steps: execution 201 of a functionally equivalent application based on the same input data on the cloud instances, each execution 201 including a processing 203 of the input data by the respective application in order to output an application result 205 in each case, comparison 207 of the respective application results in order to ascertain a comparison result, and outputting 209 of the ascertained comparison result.

Figure 3:
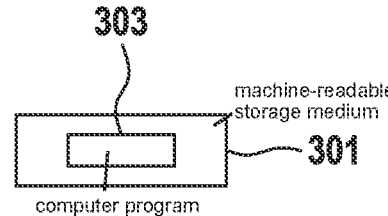
FIG. 3 shows a machine-readable storage medium, according to an example embodiment of the present invention.

FIG. 3 shows a machine-readable storage medium 301, on which a computer program 303 is stored. The computer program 303 includes commands, which, when computer program 303 is executed by a computer, cause said computer to execute a method according to the second aspect.

Figure 4:
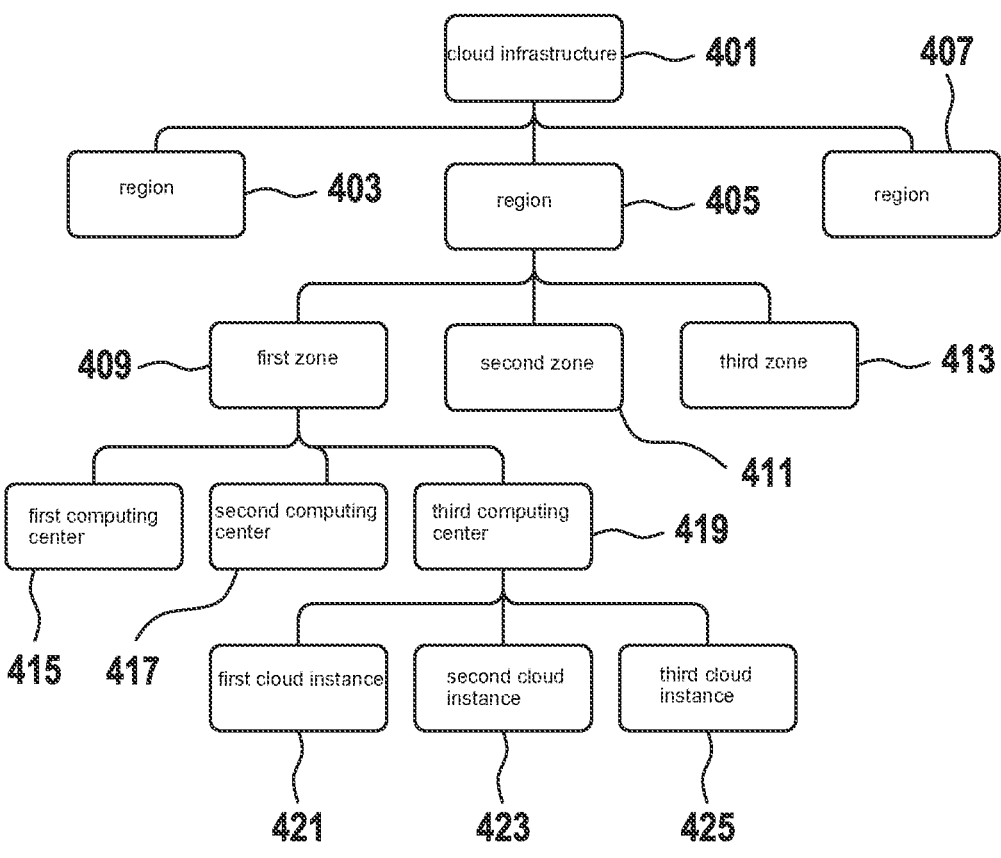
FIG. 4 shows a plurality of cloud instances, according to an example embodiment of the present invention.

FIG. 4 shows a cloud infrastructure 401, which is implemented in a distributed manner across a first region 403, a second region 405, and a third region 407, i.e. is distributed.

The three regions 403, 405, 407 may be located, for example, on different continents.

By way of example, second region 405 is divided into a first zone 409, a second zone 411, and a third zone 413. By way of example, a first computing center 415, a second computing center 417, and a third computing center 419 are located within first zone 409.

By way of example, a first cloud instance 421, a second cloud instance 423, and a third cloud instance 425 are implemented, i.e. set up, in third computing center 419.

Although not shown in FIG. 4, corresponding zones having corresponding computing centers having corresponding cloud instances may also be provided for first region 403 and third region 407, analogously with second region 405. Although not shown, for example, corresponding computing centers having corresponding implemented cloud instances may be provided for second zone 411 and for third zone 413. Although not shown, for example, corresponding cloud instances may be implemented, i.e. set up, for first computing center 415 and for second computing center 417.

Figure 5:
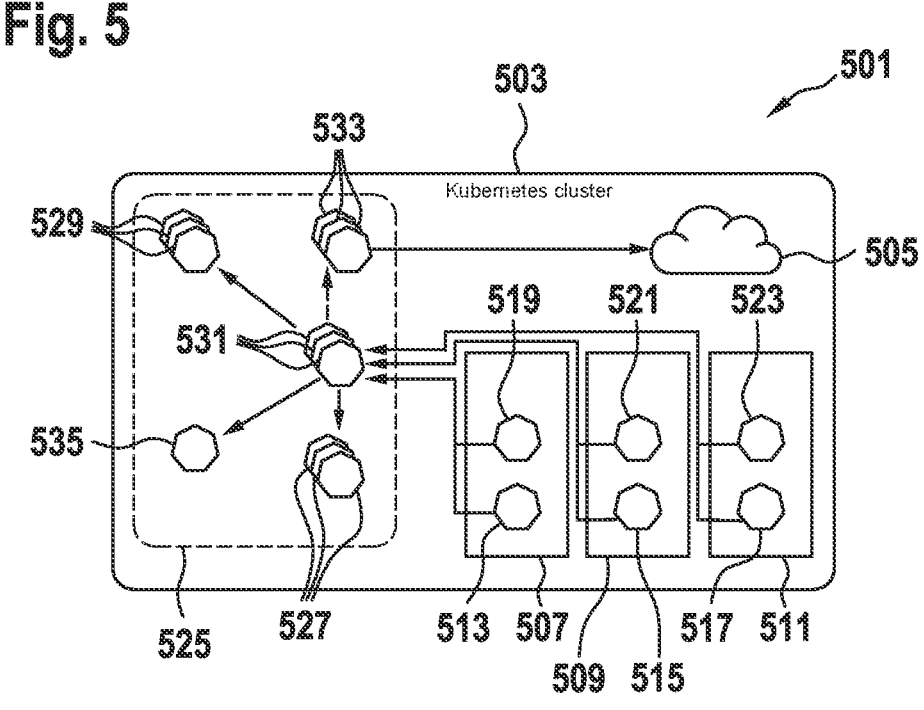
FIG. 5 shows a Kubernetes-based monitoring, according to an example embodiment of the present invention.

FIG. 5 shows a Kubernetes-based monitoring 501.

Kubernetes-based monitoring 501 includes a Kubernetes cluster 503. Kubernetes cluster 503 includes a cloud provider API 505, via which input data may be received and application results output, i.e., for example, transmitted.

Kubernetes cluster 503 includes a first node 507, a second node 509, and a third node 511.

First node 507 includes a first kube-proxy 513. Second node 509 includes a second kube-proxy 515. Third node 511 includes a third kube-proxy 517.

First node 507 includes a first kubelet 519. Second node 509 includes a second kubelet 521. Third node 511 includes a third kubelet 523.

The three nodes 507, 509, 511 are called Kubernetes nodes, also known as minions.

The Kubernetes cluster 503 includes a control plane 525, within which a plurality of schedulers 527, a plurality of controller managers 529, a plurality of API servers 531 and a plurality of cloud controller managers 533 are implemented.

In control plane 525, an etcd 535 is also implemented.

A Kubernetes-based monitoring is built, for example, according to what is known as master-slave architecture. With its components, the control plane (master) controls the nodes (minions) on which the containers in which the applications are executed run.

Various features of a Kubernetes-based monitoring will be explained below:

Kubernetes Control Plane (Control Plane 525):

The Kubernetes control plane (formerly known as the master) is the control unit of the cluster, which distributes the pods and the containers contained therein across the nodes, and manages them. A plurality of processes exist to manage these tasks. These may be distributed across a single control plane or—for the purpose of high availability—a plurality thereof. The processes are divided into:

Etcd:

etcd is a persistent, lightweight, distributed key-value database developed by CoreOS for storing the configuration of the Kubernetes cluster. It contains the overall status of the cluster and is supported by the API server.

API Server:

The API server is one of the most important components of the architecture. It provides all the other components or services, both internal and external, with JSON-formatted information via a REST interface. The API server stores all information persistently in the etcd. Authorization may take place via various mechanisms.

Scheduler:

The scheduler, as a stand-alone component, decides on which node a pod will be started. This is dependent on the resources available. It manages the usage of the nodes and monitors their workload. For this, the scheduler has to know the resource requirements of each pod. Account is taken of directives such as QoS, node affinities, and, for example, locations of the nodes in the cluster (computing centers).

Controller Manager:

The controller manager is the process containing all the control mechanisms, in which, e.g., a DaemonSet or a ReplicationController runs. It communicates with the API server to read and write all statuses.

Kubernetes Node:

The Kubernetes node, also known as a minion, is a single server for containers. For this purpose, a container runtime environment is installed on each of these nodes (e.g. Docker or rkt (Rocket)), as well as the components described below:

Kubelet:

The kubelet is responsible for the status of each node. It is controlled by the controller manager and undertakes the starting and stopping of containers. If a container is no longer running, the kubelet also takes care of the restart on the same node. Every few seconds, it reports its status to the Kubernetes control plane. Should the node fail or become unreachable, the control plane detects this based on the lack of a status report. The controller manager then starts the pods again on other, "healthy", nodes.

Kube-Proxy:

The kube-proxy is a proxy with an integrated load-balancing function. It opens the ports to the container services and manages the connections.

cAdvisor:

The cAdvisor is integrated in the kubelet and records the resources of a container (CPU, memory). Other monitoring solutions may consult this service to offer long-term recordings.

Figure 6:
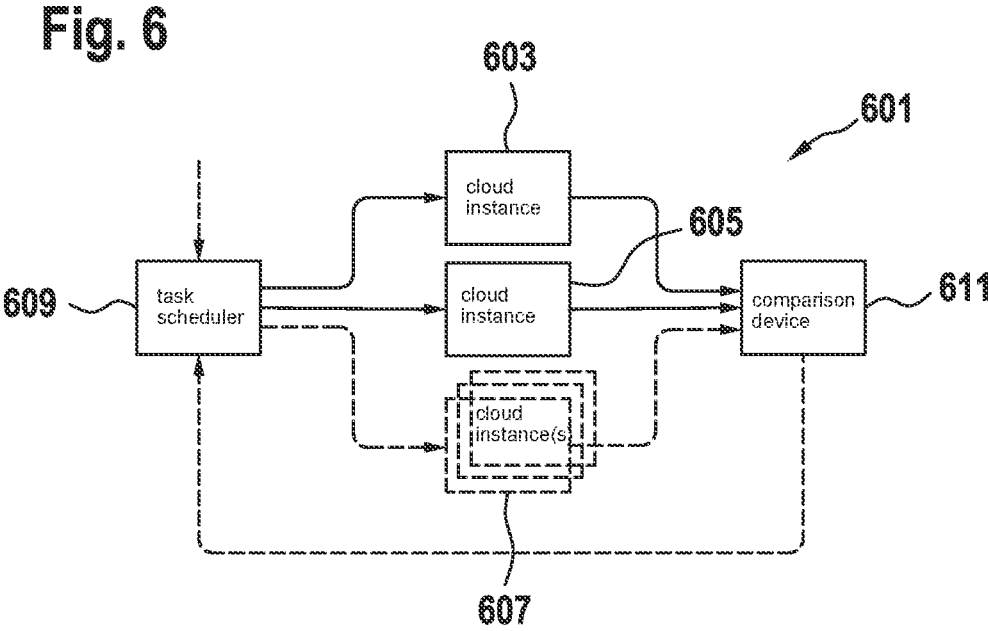
FIG. 6 shows a second system for executing functionally equivalent applications, according to an example embodiment of the present invention.

FIG. 6 shows a second system 601 for executing functionally equivalent applications.

Second system 601 includes a first cloud instance 603, a second cloud instance 605, and a further plurality of cloud instances 607.

Second system 601 includes a task scheduler 609, and a comparison device 611.

Task scheduler 609 receives requests (see explanations below) and forwards them to cloud instances 603, 605, 607, which execute the functionally equivalent application accordingly and output application results accordingly to comparison device 611. Comparison device 611 compares the respective application results and outputs a corresponding comparison result to task scheduler 609.

Task scheduler 609 receives the request for processing the input data from outside the system and distributes it across two or more cloud instances, in the present case cloud instances 603, 605, 607. It may enrich the request, for example, with metadata (e.g., a sequence number), and/or may also pre-process and prepare the received input data (e.g., decode input data, adapt them to an internal model, and/or convert them).

The comparison result is generally returned to task scheduler 609, because this terminates the communication protocol with a requester of the request and is therefore able to return the application results to the requester.

This return is not essential; in particular in the case of streaming applications, in which input data are received continuously without the expectation of a response to each discrete message, comparison device 611 may also relay and/or stream back the application results.

The concept described here advantageously provides a guarantee of safety by the cloud system, for example. Safety here means the certainty that no faults are caused by the cloud system. This is achieved, for example, by the fact that, by utilizing the redundancy solutions offered by the cloud providers (which may also be distributed on a regional or even continental basis), it is possible to draw on more than one running cloud instance. In order to ensure that the desired application runs reliably on all cloud instances in each case, it is run there, for example, in a monitored environment (e.g., Kubernetes). This offers the benefit that a "degraded" or inactive application is detected, ended, and restarted.

This advantageously has the effect that there is always more than one application available simultaneously.

It is further provided that the application results of the individual applications are compared with each other in order to ensure that they are also identical within the predefined limits, and in order to react appropriately in the event of discrepancies. This is achieved, for example, by a monitoring (=comparison of results) via the lockstep mechanism.

The concept described here is therefore based in particular on a combining of existing possibilities, such as "high availability of the application" by the cloud provider with the possibility of monitoring the individual application constantly and being able to restart it if necessary, and a solution approach to how the individual application results can be compared with each other and evaluated (lockstep) in order to reach a result that meets the high safety requirements (e.g. ISO 26262).

In this regard, FIG. 4 shows how various application instances (cloud instances) may be distributed at different geographic locations (even up to a continental distribution). At least two of these cloud instances are used. On each of these cloud instances, the desired application is then started and monitored, as shown, for example, in FIG. 5, for example in the context of a Kubernetes cluster. Via the cloud provider API, the processed data (application results) are relayed to the comparison device (see FIG. 6), where they are compared with the application results from the other cloud instances and evaluated. The sum of these steps leads advantageously to the fact that the redundancy needed for an accepted safety argument exists and can be guaranteed.

If diverse redundancy is required for a safety argument, this system architecture does not have to be modified. Diversity is achieved, for example, by different algorithms in the applications that run in the individual Kubernetes clusters.

What is claimed is:

1. A system for executing functionally equivalent applications, comprising:
- a cloud system including a plurality of cloud instances executing on at least one computer, each of the plurality of cloud instances being set up to respectively execute a functionally equivalent respective application relative to one another based on the same input data, the respective execution including a processing of the input data by the respective application to output a respective application result in each case;
- a comparison device, which is set up to compare the respective application results to ascertain a comparison result and to output the comparison result that has been ascertained;

wherein the system is configured to generate a control signal for guiding an at least partially automated vehicle, based on the output comparison result; and
wherein the at least partially automated motor vehicle is guided in an at least partially automated fashion using the control signal.

2. The system as recited in claim 1, wherein in each of the cloud instances, a Kubernetes-based monitoring is implemented, which is set up to monitor the execution of the application.

3. The system as recited in claim 1, wherein the comparison device is set up to compare the respective application results on a lockstep basis.

4. The system as recited in claim 1, wherein the comparison device is set up to evaluate the respective application results so that the comparison of the respective application results includes a comparison of the evaluated application results.

5. The system as recited in claim 4, wherein the comparison device is set up to evaluate the respective application results as a function of the respective cloud instance in which the respective application was executed.

6. The system as recited in claim 5, wherein the cloud instances are each characterized by one or more of the following cloud instance attributes, and the comparison device being set up to evaluate the respective application results as a function of one or more of the following cloud instance attributes: location, computing capacity, bandwidth.

7. The system as recited in claim 1, wherein the function corresponding to the functionally equivalent applications includes an at least partially automated driving function, the at least partially automated driving function being an infrastructure-based, at least partially automated driving function.

8. The system as recited in claim 1, wherein the input data include environment data, which represent an environment of the motor vehicle, the processing of the input data by each of the respective applications including analyzing the environment data to detect one or more objects in the motor vehicle's environment, each application result including an object list, which indicates the detected object or objects in the motor vehicle's environment.

9. A method for executing functionally equivalent applications using a cloud system including a plurality of cloud instances, the method comprising the following steps:
- respectively executing each respective application of the functionally equivalent applications, based on the same input data, on respective cloud instances executing on at least one computer, each respective execution including a processing of the input data by the respective application to output a respective application result;
- comparing the respective application results to ascertain a comparison result;
- outputting the ascertained comparison result;
- generating a control signal for guiding an at least partially automated vehicle, based on the output comparison result; and
- guiding the at least partially automated motor vehicle in an at least partially automated fashion using the control signal.

10. The method as recited in claim 9, wherein, in each of the cloud instances, a Kubernetes-based monitoring is implemented, which monitors the execution of the respective application.

11. The method as recited in claim 9, wherein the respective application results are compared on a lockstep basis.

12. The method according to claim 9, wherein the respective application results are evaluated so that the comparison of the respective application results includes a comparison of the evaluated application results.

13. The method as recited in claim 12, wherein the respective application results are evaluated as a function of the respective cloud instance in which the respective application was executed.

14. The method as recited in claim 13, wherein the cloud instances are each characterized by one or more of the following cloud instance attributes, and the respective application results being evaluated as a function of one or more of the following cloud instance attributes: location, computing capacity, bandwidth.

15. The method as recited in claim 9, wherein a function corresponding to the functionally equivalent applications includes an at least partially automated driving function, the at least partially automated driving function being an infrastructure-based, at least partially automated driving function.

16. The method as recited in claim 9, wherein the input data include environment data, which represent an environment of the motor vehicle, the processing of the input data by the respective applications includes analyzing the environment data to detect one or more objects in the motor vehicle's environment, each respective application result including an object list, which indicates the detected object or objects in the motor vehicle's environment.

17. A non-transitory machine-readable storage medium on which is stored a computer program for executing functionally equivalent applications using a cloud system including a plurality of cloud instances, the computer program, when executed by a computer, causing the computer to perform the following steps:

respectively executing each of the functionally equivalent applications, based on the same input data, on respective cloud instances executing on at least one computer, each respective execution including a processing of the input data by the respective application to output an respective application result;

comparing the respective application results to ascertain a comparison result;

outputting the ascertained comparison result;

generating a control signal for guiding an at least partially automated vehicle, based on the output comparison result; and guiding the at least partially automated motor vehicle in an at least partially automated fashion using the control signal.

\* \* \* \* \*